(12) United States Patent
Heit et al.

(10) Patent No.: US 8,714,618 B1
(45) Date of Patent: May 6, 2014

(54) VEHICLES HAVING UTILITY BED AND LOCKING DEVICE

(71) Applicant: Honda Motor Co., Ltd., Tokyo (JP)

(72) Inventors: Casey Heit, Marysville, OH (US); Eric B. Stevens, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/760,142

(22) Filed: Feb. 6, 2013

(51) Int. Cl.
*B60N 2/00* (2006.01)
*B60N 2/28* (2006.01)

(52) U.S. Cl.
CPC .................... *B60N 2/2821* (2013.01)
USPC ......................................................... 296/64

(58) Field of Classification Search
USPC ........... 296/64, 65.09, 65.03, 65.11, 68.1, 69; 280/38
See application file for complete search history.

(56) References Cited

U.S. PATENT DOCUMENTS

| | | | | |
|---|---|---|---|---|
| 5,398,985 | A * | 3/1995 | Robinson | 296/10 |
| 5,501,501 | A * | 3/1996 | White et al. | 296/64 |
| 6,237,981 | B1 | 5/2001 | Selleck | |
| 6,364,391 | B1 * | 4/2002 | Everett | 296/51 |
| 7,731,260 | B2 * | 6/2010 | Heller | 296/50 |
| 8,002,331 | B2 * | 8/2011 | Bowers | 296/183.2 |
| 8,075,040 | B2 * | 12/2011 | Arnold | 296/69 |
| 8,136,857 | B2 * | 3/2012 | Shimizu et al. | 296/26.09 |
| 8,172,310 | B2 | 5/2012 | Gagnon et al. | |
| 8,313,133 | B2 * | 11/2012 | King | 296/69 |
| 8,313,136 | B2 * | 11/2012 | Arnold et al. | 296/183.2 |
| 8,328,262 | B2 * | 12/2012 | Kawabata et al. | 296/24.43 |
| 8,348,322 | B2 * | 1/2013 | King | 296/24.33 |
| 8,353,534 | B2 * | 1/2013 | Arnold et al. | 280/801.1 |
| 8,376,443 | B2 | 2/2013 | Kemp et al. | |
| 8,556,324 | B1 * | 10/2013 | Yamamoto et al. | 296/68.1 |
| 8,567,846 | B1 * | 10/2013 | Stevens et al. | 296/183.1 |
| 8,585,116 | B2 * | 11/2013 | King | 296/24.33 |
| 2010/0308614 | A1 * | 12/2010 | Arnold | 296/37.6 |
| 2011/0148088 | A1 * | 6/2011 | Arnold et al. | 280/807 |
| 2011/0156429 | A1 * | 6/2011 | Shimizu et al. | 296/26.09 |
| 2011/0169289 | A1 * | 7/2011 | Arnold et al. | 296/10 |
| 2011/0187178 | A1 * | 8/2011 | King | 298/17 R |
| 2012/0256444 | A1 * | 10/2012 | Thurmon | 296/182.1 |
| 2013/0168994 | A1 * | 7/2013 | Yamamoto et al. | 296/63 |

* cited by examiner

*Primary Examiner* — Kiran B Patel
(74) *Attorney, Agent, or Firm* — Ulmer & Berne LLP

(57) ABSTRACT

A vehicle includes a frame, a utility bed, a seat, and a locking device. The utility bed includes a bed frame and is pivotally coupled with the frame between a hauling position and a dumping position. The seat includes a seat back that is pivotally coupled with the bed frame between a stowed position and a deployed position. The locking device is coupled with the bed frame and includes a latch. The latch is moveable relative to both the bed frame and the seat back, between a lock position and an unlock position. When the seat back is in the stowed position, the latch is in the unlock position and disengaged from the frame. When the seat back is in the deployed position and the utility bed is in the hauling position, the latch is in the lock position and engaged with the frame.

10 Claims, 10 Drawing Sheets

VEHICLES HAVING UTILITY BED AND LOCKING DEVICE

TECHNICAL FIELD

Disclosed herein are vehicles having a locking device for selectively preventing dumping of a utility bed.

BACKGROUND

Some conventional utility vehicles include a utility bed which is pivotable between a hauling position and a dumping position.

SUMMARY

In accordance with one embodiment, a vehicle comprises a frame, a utility bed, a seat, and a locking device. The utility bed comprises a bed frame. The utility bed is pivotally coupled with the frame and is pivotable between a hauling position and a dumping position. The seat comprises a seat back. The seat back is pivotally coupled with the bed frame and is pivotable between a stowed position and a deployed position. The locking device is coupled with the bed frame and comprises a latch. The latch is moveable relative to both the bed frame and the seat back, between a lock position and an unlock position. When the seat back is in the stowed position, the latch is in the unlock position and disengaged from the frame. When the seat back is in the deployed position and the utility bed is in the hauling position, the latch is in the lock position and engaged with the frame.

In accordance with another embodiment, a vehicle comprises a frame, a utility bed, a left seat, a right seat, and a locking device. The utility bed comprises a bed frame. The utility bed is pivotally coupled with the frame and is pivotable between a hauling position and a dumping position. The left seat comprises a left seat back. The left seat back is pivotally coupled with the bed frame and is pivotable between a stowed position and a deployed position. The right seat comprises a right seat back. The right seat back is pivotally coupled with the bed frame and is pivotable between a stowed position and a deployed position. The locking device is coupled with the bed frame and comprises a left latch and a right latch. The left latch is moveable relative to each of the bed frame, the left seat back, and the right latch, between a lock position and an unlock position. The right latch is moveable relative to each of the bed frame, the right seat back, and the left latch, between a lock position and an unlock position. When the left seat back is in the stowed position, the left latch is in the unlock position and disengaged from the frame. When the right seat back is in the stowed position, the right latch is in the unlock position and disengaged from the frame. When the left seat back is in the deployed position and the utility bed is in the hauling position, the left latch is in the lock position and engaged with the frame. When the right seat back is in the deployed position and the utility bed is in the hauling position, the right latch is in the lock position and engaged with the frame.

BRIEF DESCRIPTION OF THE DRAWINGS

Various embodiments will become better understood with regard to the following description, appended claims and accompanying drawings wherein:

DETAILED DESCRIPTION

Figure 1:
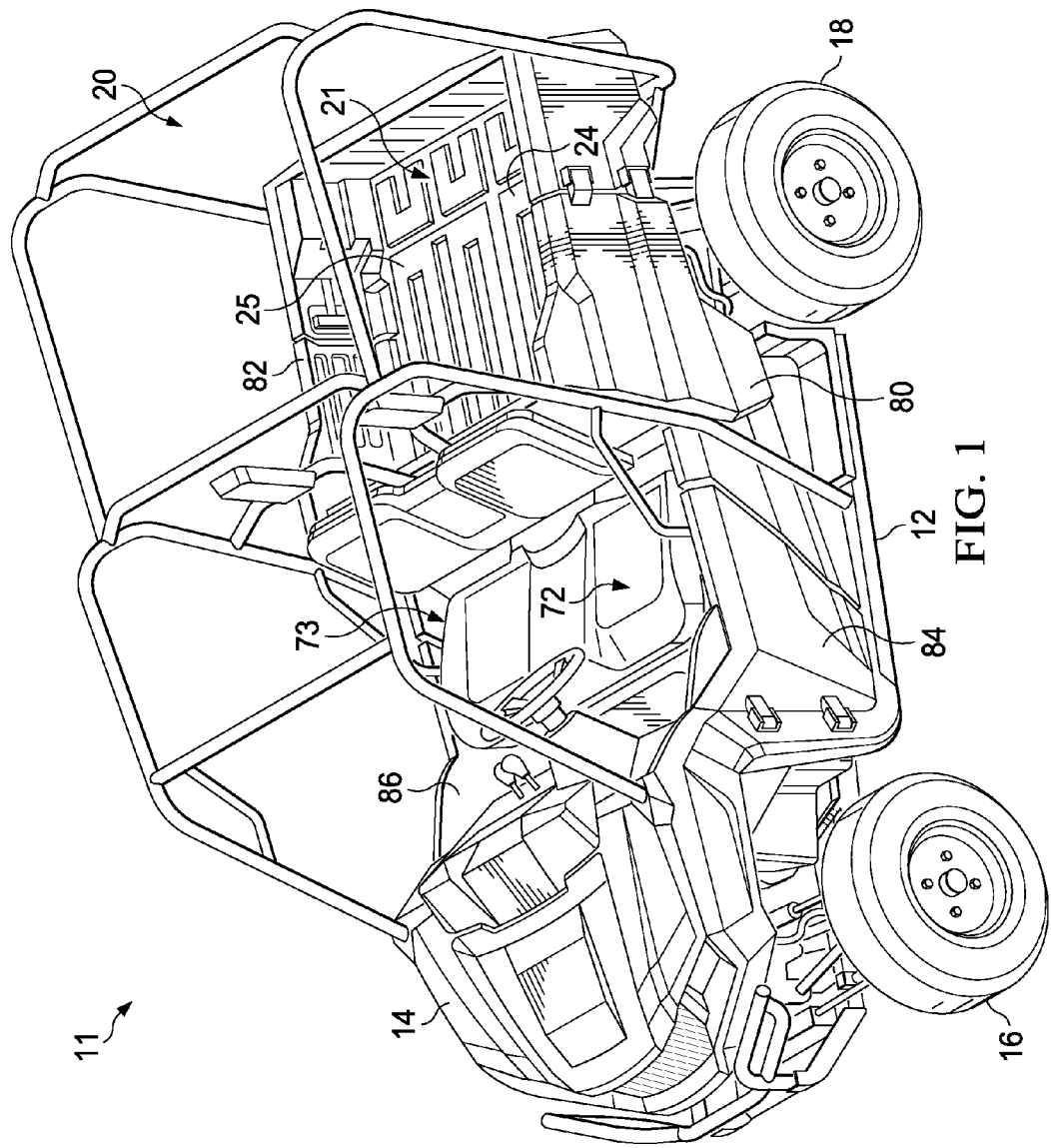
FIG. 1 is top front left perspective view depicting a multi-use vehicle ("MUV") having a utility bed in accordance with one embodiment, wherein the utility bed is shown to be in a hauling position, and wherein left and right rear seat backs are shown to be in respective stowed positions.

Certain embodiments are hereinafter described in detail in connection with the views and examples of FIGS. 1-10, wherein like numbers illustrate like elements among the views. FIG. 1 illustrates a vehicle 11 that can include a frame, indicated generally at 12, and a body 14 supported by frame 12. Vehicle 11 can further include a pair of front wheels (e.g., 16) and a pair of rear wheels (e.g., 18), which can be suspended from frame 12 and can be rotatable relative to frame 12. Vehicle 11 can also include a source of motive power (not shown), which can be an internal combustion engine and/or one or more electric motors, and a drivetrain (not shown) for transferring torque from the source of motive power to the wheels (e.g., 16 and/or 18).

Vehicle 11 is shown to be a utility-type vehicle that can include a utility bed 20 that can be supported by at least one of the frame 12 and the body 14. The utility bed 20 can be selectively pivotable as a dump-type bed. The utility bed 20 can be configured to support cargo and/or passengers for transportation by the vehicle 11. In one embodiment, the utility bed 20 can be convertible, to selectively provide one or more rear seats, such as a left seat 22 and a right seat 23, to facilitate seating of persons (as shown in FIG. 2), and to alternatively facilitate folding downward of the left seat 22 and/or the right seat 23 into the utility bed 20 to assist a cargo floor 21 of the utility bed 20 in defining a cargo support surface (as shown in FIG. 1).

Figure 2:
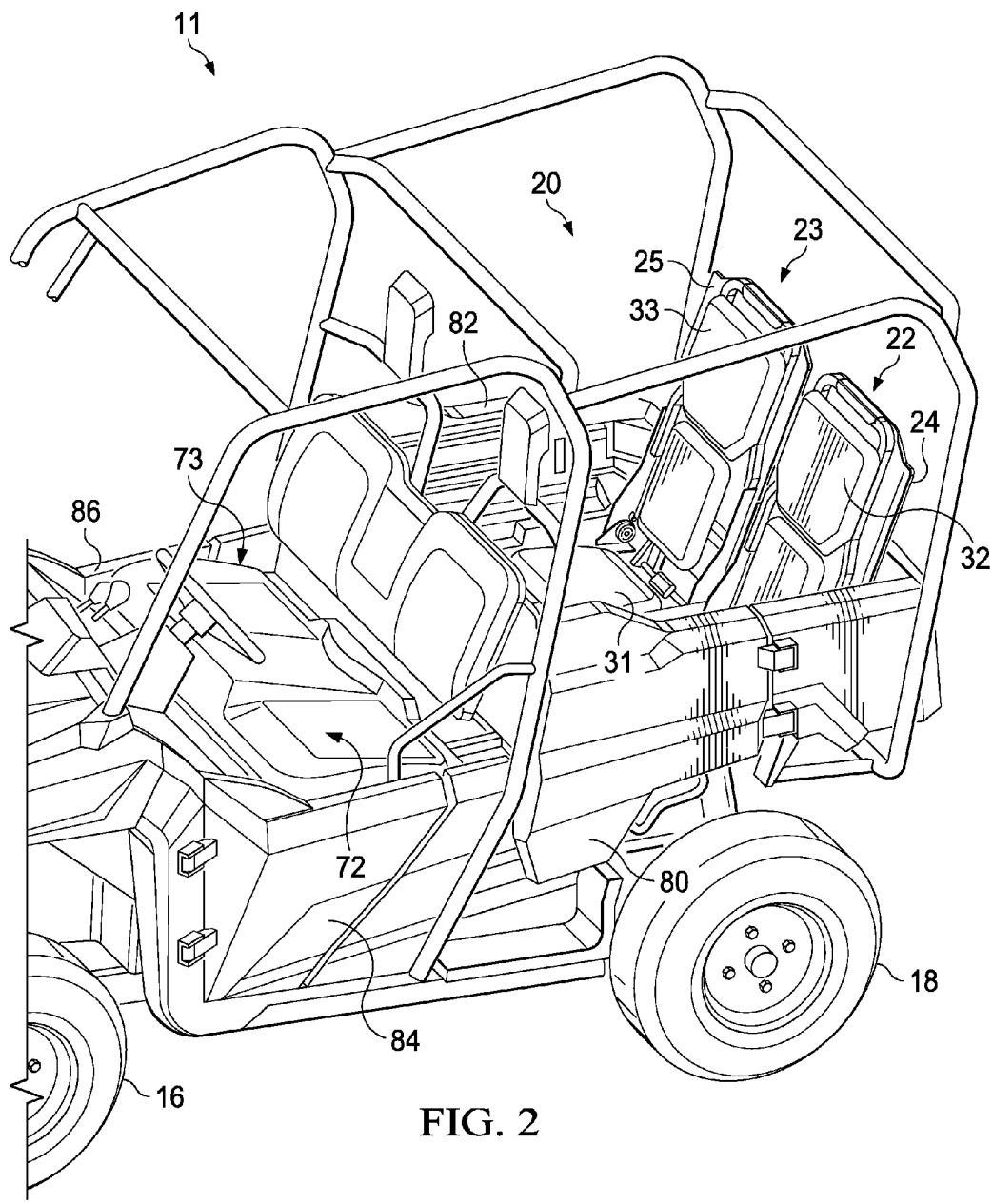
FIG. 2 is an enlarged front left top perspective view depicting a portion of the vehicle of FIG. 1, but wherein the left and right rear seat backs are shown to be in respective deployed positions.
Figure 3:
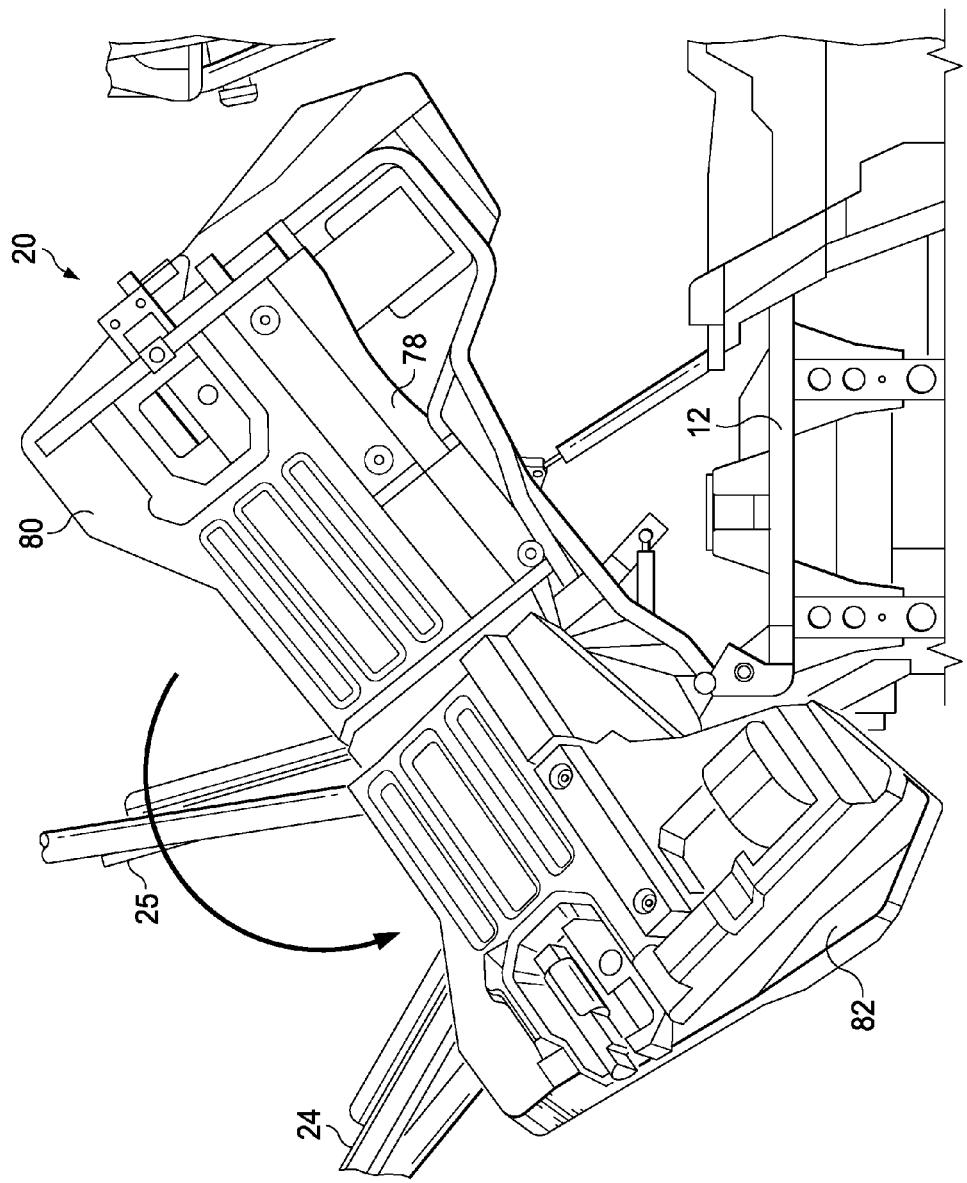
FIG. 3 is an enlarged right side elevational view generally depicting the vehicle of FIG. 1, but wherein the utility bed is shown to be in a dumping position, and wherein a rear right door is shown to be in an opened position, and wherein the left and right rear seat backs are shown to be in deployed and intermediate positions, respectively.

More particularly, the utility bed 20 can include a bed frame 78 which can be pivotally coupled with the frame 12 of the vehicle 11, as generally shown in FIG. 3, such that the utility bed 20 is pivotally coupled with the frame 12 and pivotable between a hauling position (FIGS. 1 and 2) and a dumping position (FIG. 3). The left seat 22 can include a seat back 24 that is pivotally coupled with the bed frame 12, such that the seat back 24 is pivotable about a seat axis "A" (FIG. 7) between a stowed position (FIG. 1) and a deployed position (FIG. 2). Similarly, the right seat 23 can include a seat back 25 that is pivotally coupled with the bed frame 78, such that the seat back 25 is pivotable about the seat axis "A" between a stowed position (FIG. 1) and a deployed position (FIG. 2). The bed frame 78 can include any of a variety of structural and/or decorative members or panels, formed from metal, plastic, fiberglass, carbon fiber or otherwise.

Figure 4:
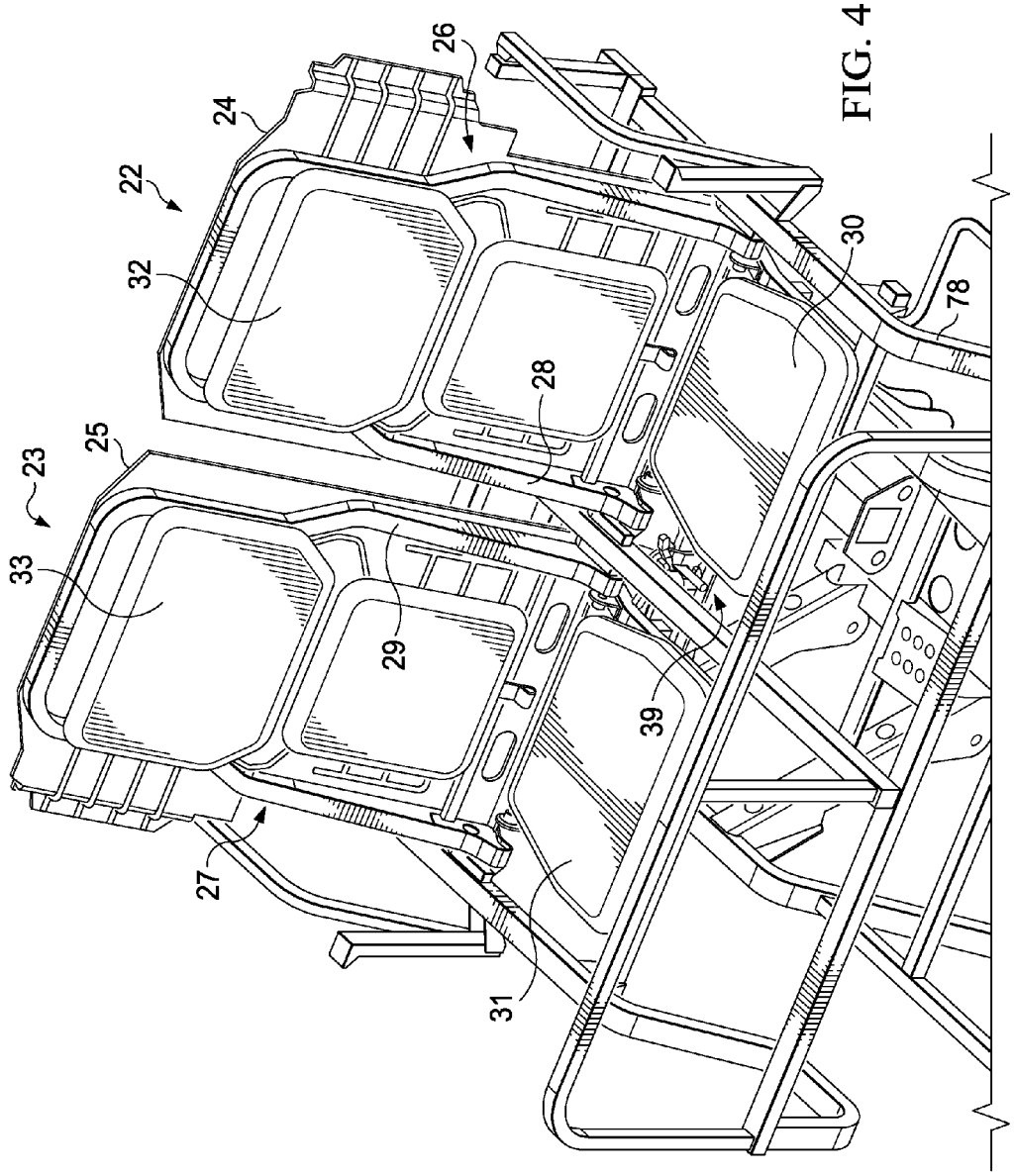
FIG. 4 is a front left top perspective view depicting a portion of the vehicle of FIG. 2, wherein certain components of the vehicle have been removed for clarity of illustration.

With reference to FIG. 4, the seat back 24 of the left seat 22 can include a seat back frame 26 and a seat back cushion 32 supported by the seat back frame 26. In one embodiment, the seat back frame 26 can be pivotally coupled with the bed frame 78. Likewise, the seat back 25 of the right seat 23 can include a seat back frame 27 and a seat back cushion 33 supported by the seat back frame 27. In one embodiment, the seat back frame 27 can be pivotally coupled with the bed frame 78.

The left seat 22 can additionally include a seat bottom cushion 30 that, together with the seat back cushion 32 of the seat back 24, can comfortably support a person when the left seat 22 is deployed as shown in FIG. 2. The right seat 23 can additionally include a seat bottom cushion 31 that, together with the seat back cushion 33 of the seat back 25, can comfortably support a person when the right seat 23 is deployed as shown in FIG. 2. In one embodiment, left and right rear doors 80 and 82 can be pivotally coupled with the frame 12 to facilitate selective passenger access to the left and right seats 22, 23, respectively, as shown in FIG. 2. Left and right front doors 84 and 86 can be can be pivotally coupled with the frame 12 to facilitate selective passenger access to left and right front seats 72 and 73, respectively, as also shown in FIGS. 1-2.

The vehicle 11 can also include a locking device (shown generally as 39) coupled with the bed frame 78 and associated with the left and right seats 22 and 23. The locking device 39 can be configured to prevent movement of the utility bed 20 from the hauling position to the dumping position when either or both of the seat backs 24 and 25 are partially or fully deployed. In one embodiment, the locking device 39 can be provided as shown and described with reference to FIGS. 4-10. More particularly, with reference to FIG. 5, the locking device 39 is shown to include a left portion 40 and a right portion 41. The left portion 40 can be associated with the left seat 22, and configured to prevent movement of the utility bed 20 from the hauling position to the dumping position when the seat back 24 is partially or fully deployed. The right portion 41 can be associated with the right seat 23, and configured to prevent movement of the utility bed 20 from the hauling position to the dumping position when the seat back 25 is partially or fully deployed.

Figure 5:
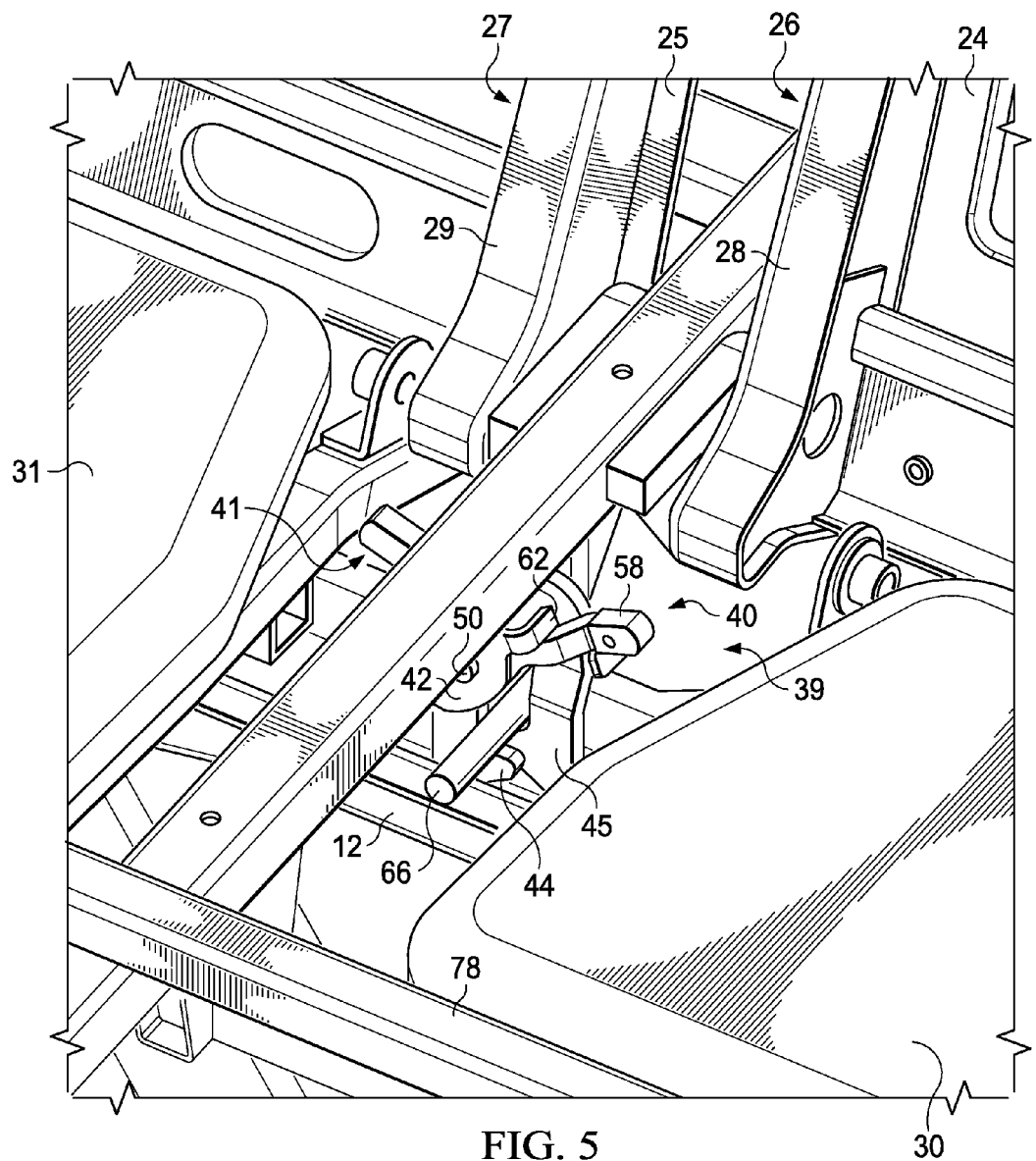
FIG. 5 is an enlargement of a portion of FIG. 4.
Figure 6:
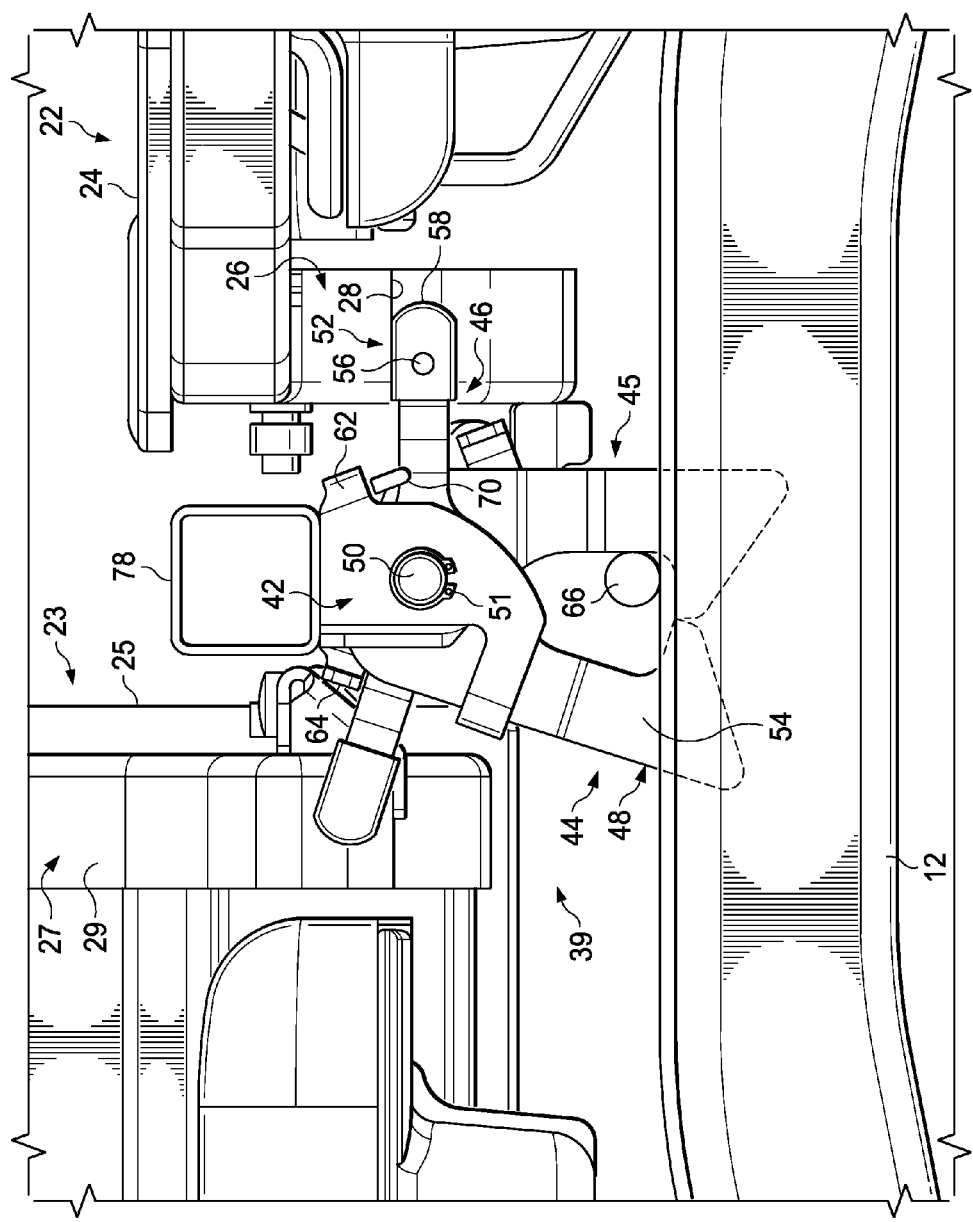
FIG. 6 is a front elevational view, shown partially in cross section, depicting the arrangement of FIG. 5, but wherein the left rear seat back is shown to be in the stowed position.
Figure 8:
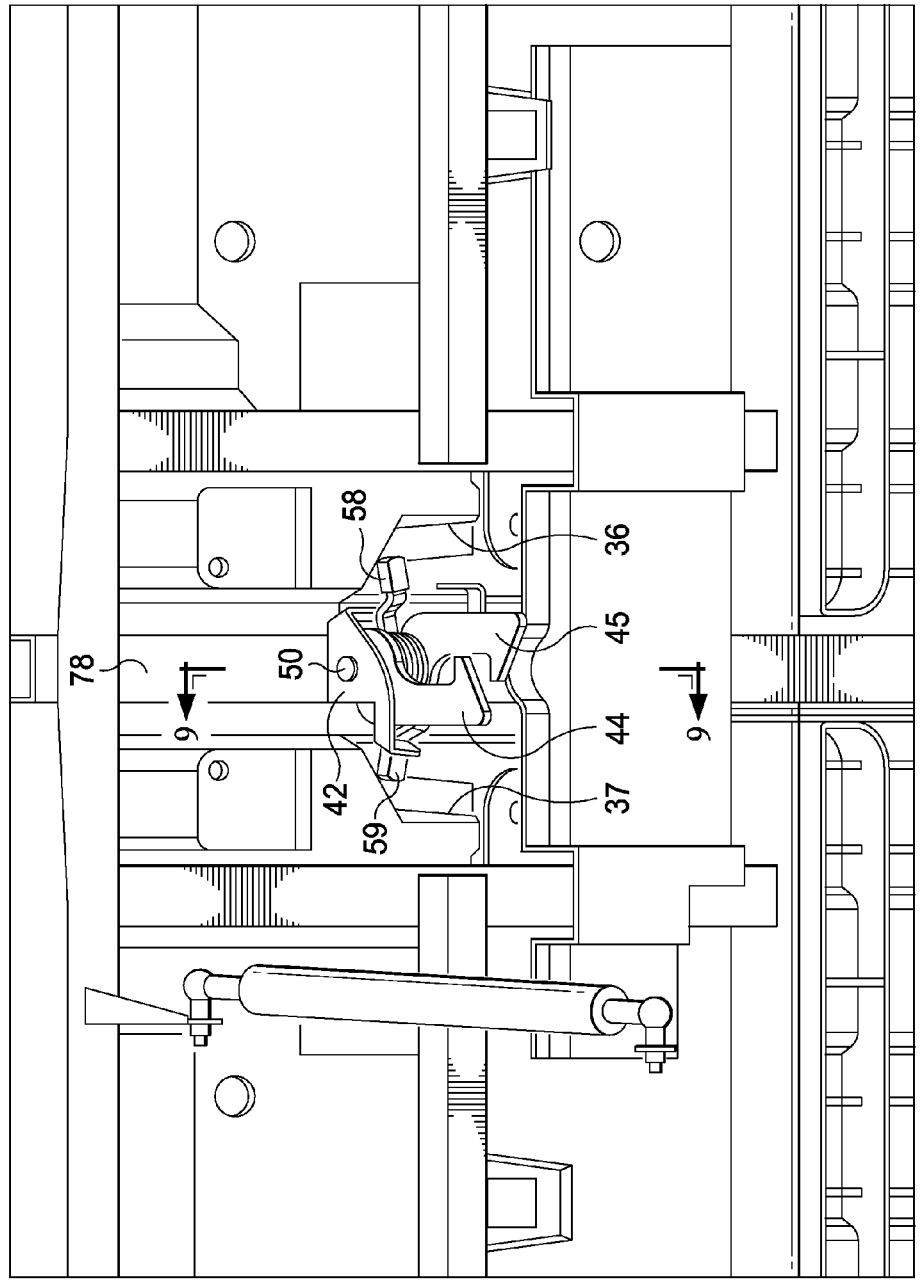
FIG. 8 is a front bottom perspective view of the utility bed of the vehicle of FIG. 7.
Figure 9:
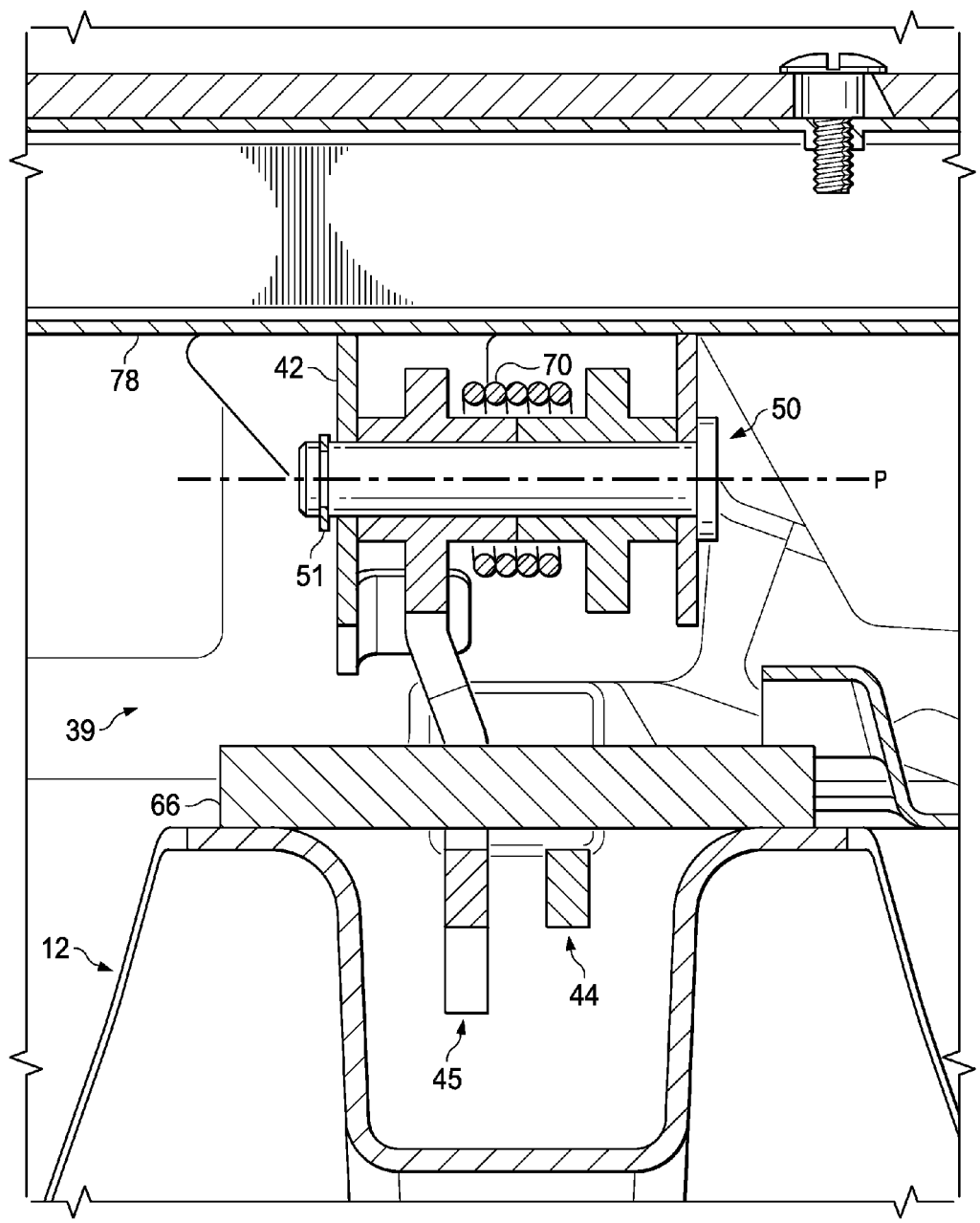
FIG. 9 is a cross-sectional view taken along lines 9-9 in FIG. 8, and in association with a frame of the vehicle of FIG. 1.
Figure 10:
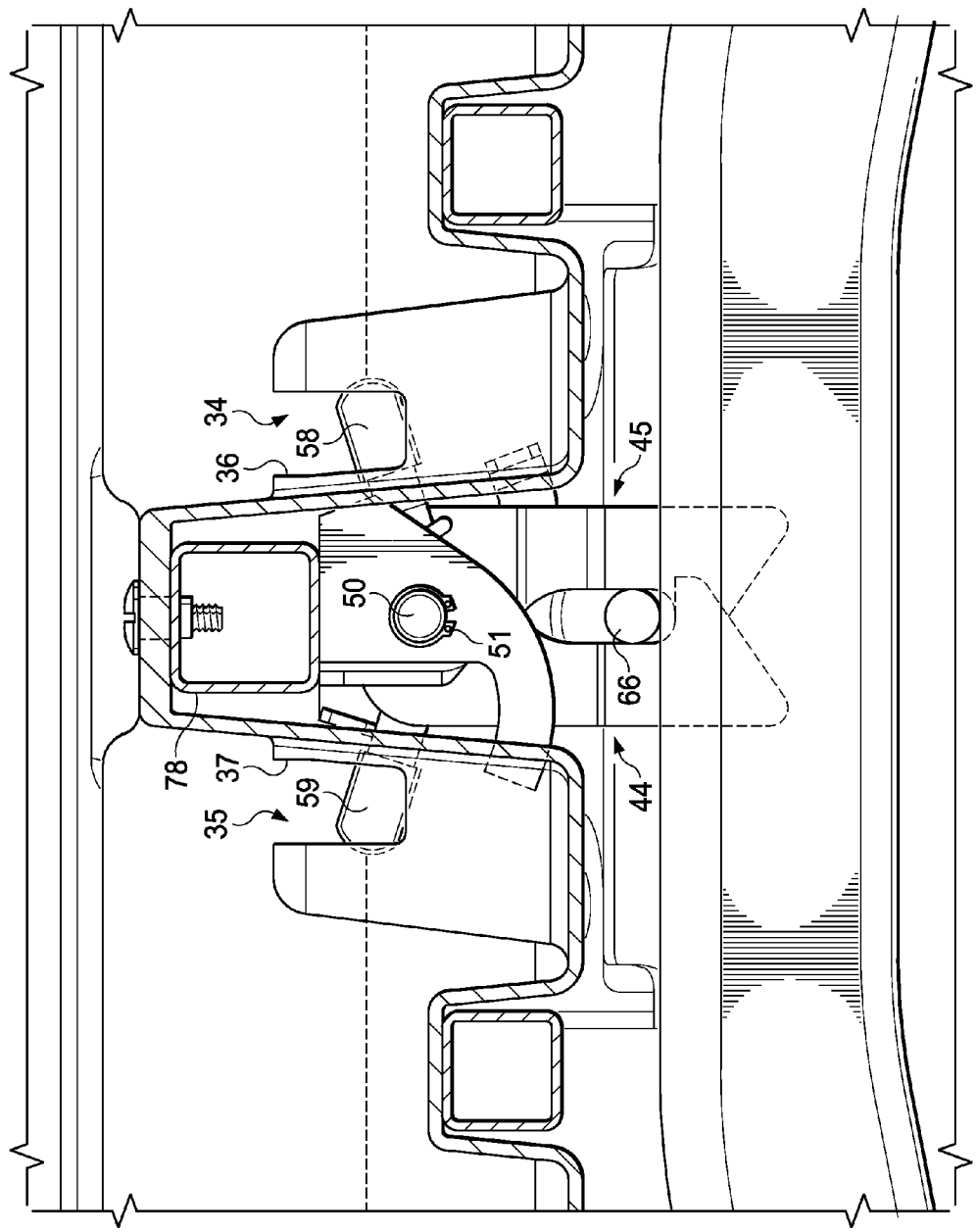
FIG. 10 is a cross-sectional view taken along lines 10-10 in FIG. 7.

More particularly, the left portion 40 of the locking device 39 can include a latch 44, and the right portion 41 of the locking device 39 can include a latch 45. The locking device 39 can also include a latch bracket 42 that is attached to the bed frame 78 of the utility bed 20, such as with fasteners or welding. Each of the latches 44 and 45 can be pivotally coupled to the latch bracket 42 by a pivot member 50, as shown in FIGS. 5-6 and 8-10. The pivot member 50 can define a pivot axis "P" (FIG. 9) which, in one embodiment, can be generally transverse to the seat axis "A". In one embodiment, the pivot member 50 can comprise a pin which is pivotally secured, relative to the latch bracket 42, by a clip 51. Each of the latches 44 and 45 can be pivotal about the pivot axis "P", and can be moveable relative to the bed frame 78, the seat backs 24 and 25, and one another, between respective lock and unlock positions. For example, FIGS. 4-5 and 10 show both of the latches 44 and 45 in respective lock positions. As another example, FIG. 6 shows the latch 44 in an unlock position, and the latch 45 in a lock position.

In one embodiment, the locking device 39 further comprises a biasing member that is configured to bias one or both of the latches 44 and 45 toward the respective lock positions. For example, as shown in FIG. 9, a spring 70 can be disposed in surrounding relationship with the pivot member 50 and can be coupled with each of the latches 44 and 45, to bias the latches 44 and 45 relative one another and/or the latch bracket 42. In one embodiment, the latch bracket 42 can include stops 62 and 64 (FIG. 6) that are positioned to limit motion of the latches 44 and 45, respectively, for example, relative to the latch bracket 42, in response to force of the spring 70.

Referring to FIG. 6, the latch 44 can include an actuator portion 46 and an engagement portion 48. The engagement portion 48 can include a distal end portion 54 that is generally hook-shaped, as shown in FIG. 6, to selectively engage a latch-engaging member 66 of the frame 12, as described in further detail below. The actuator portion 46 of the latch 44 can include a proximal end portion 52 which includes a handle 56 and a cap 58. The cap 58 is shown to cover at least a portion of the handle 56. In one embodiment, the handle 56 and the engagement portion 48 can be formed as a unitary structure from sheet metal, such as in a stamping process. The cap 58 can be formed from plastic, a resilient material such as rubber, or another suitable material. In another embodiment, a cap can be provided integrally as a unitary structure with the handle of a latch, or might not be provided. The latch 45 can have a configuration similar to that described with respect to the latch 44.

Figure 7:
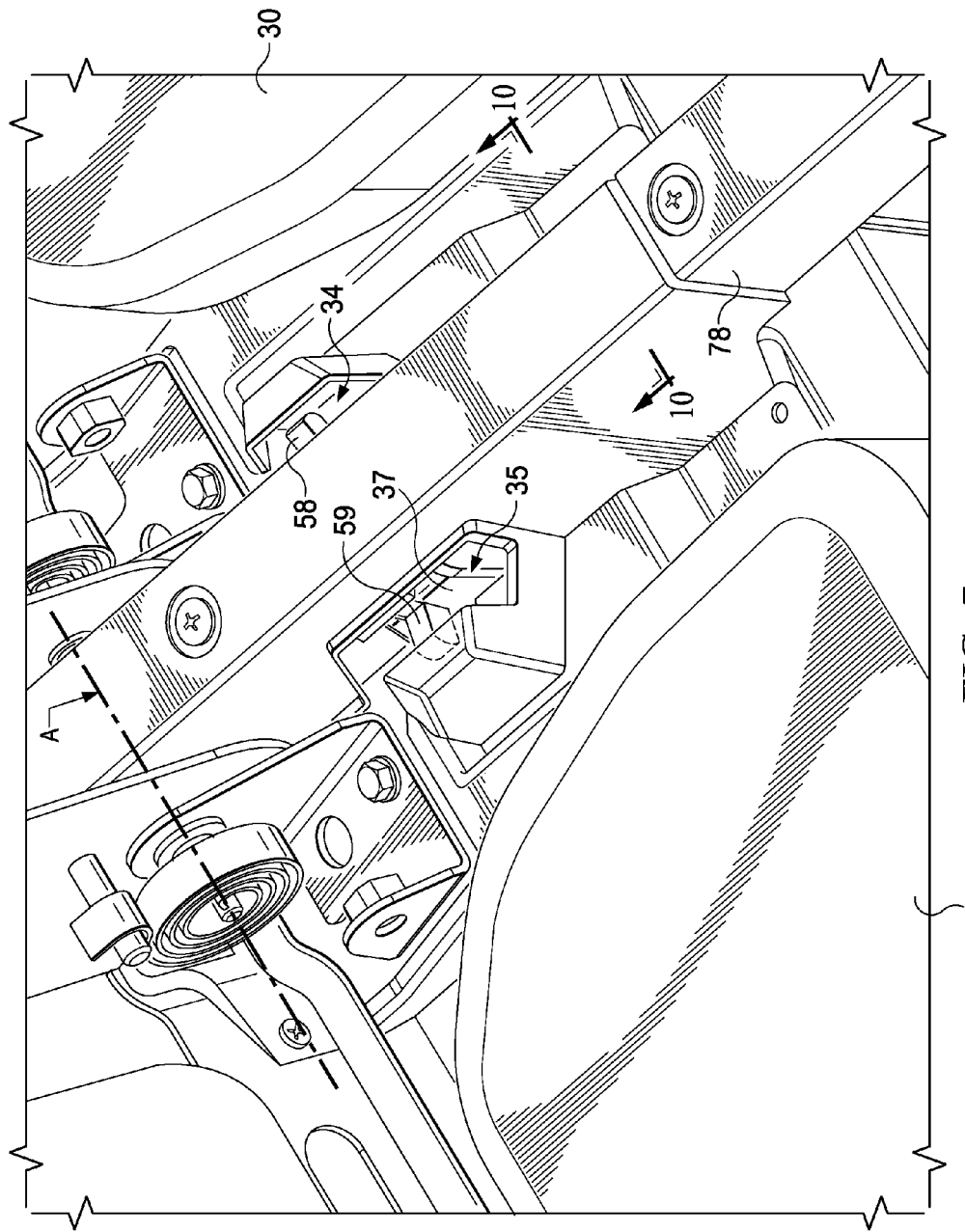
FIG. 7 is a front right top perspective view depicting a portion of the vehicle of FIG. 2.

The locking device 39 can be positioned laterally between the seat bottom cushions 30 and 31, as will be appreciated with reference to FIG. 7. More particularly, the bed frame 78 is shown in FIGS. 7-8 to define channels 34 and 35, as well as slots 36 and 37 that communicate with the respective channels 34 and 35. The proximal end portion 52 of the latch 44 can be received through the slot 36 and into the channel 34. For example, at least a portion of the cap 58 can reside within the channel 34, as shown in FIG. 7. Similarly, a proximal end portion of the latch 45 can be received through the slot 37 and into the channel 35. For example, at least a portion of a cap 59 of a proximal end of the latch 45 can reside within the channel 35, as shown in FIG. 7. In this configuration, the cap 58 can be configured to selectively contact a leading edge 28 (FIG. 5) of the seat back frame 26, and the cap 59 can be configured to selectively contact a leading edge 29 (FIG. 5) of the seat back frame 27, as will be discussed further below.

In one embodiment, the channels 34 and 35 can be sufficiently narrow such that typically not more than a single finger or thumb of a person can contact the respective cap 58 or 59. In such a configuration, the spring 70 can exert sufficient force such that a single finger or thumb of the person typically will have insufficient strength to move the respective latch 44 and 45 against the bias of the spring 70.

Operation of the locking device 39, in accordance with one embodiment, will now be described. When the seat back 24 of the left seat 22 is in the stowed position (FIG. 1), the leading edge 28 of the seat back frame 26 contacts the cap 58 of the latch 44, forcing the proximal end portion 52 of the latch 44 downwardly within the channel 34, and causing the latch 44 to be in the unlock position and disengaged from the latch-engaging member 66 of the frame 12, as shown in FIG. 6. Similarly, when the seat back 25 of the right seat 23 is in the stowed position (FIG. 1), the leading edge 29 of the seat back frame 27 similarly contacts the cap 59 of the latch 45, forcing the proximal end portion of the latch 45 downwardly within the channel 35, and causing the latch 45 to be in the unlock position and disengaged from the latch-engaging member 66 of the frame 12. When both of the latches 44 and 45 are so disengaged from the latch-engaging member 66, the utility bed 20 is free to pivot from the hauling position (FIG. 1) to the dumping position (FIG. 3).

When the seat back 25 of the right seat 23 is not in the stowed position, and is thus in a deployed position or intermediate position, the leading edge 29 of the seat back frame 27 is spaced from and no longer contacts the cap 59 of the latch 45, thus allowing the proximal end portion of the latch 45 to return upwardly within the channel 35, and causing the latch 45 to be in the lock position, as shown in FIG. 6. Similarly, when the seat back 24 of the left seat 22 is not in the stowed position, and is thus in a deployed position or intermediate position, the leading edge 28 of the seat back frame 26 is spaced from and no longer contacts the cap 58 of the latch 44, thus allowing the proximal end portion 52 of the latch 44 to return upwardly within the channel 34, and causing the latch 44 to be in the lock position. When the utility bed 20 is in the hauling position (FIG. 1) and one or both of the latches 44 and 45 is/are in the lock position, one or both of the latches 44 and 45 (i.e., whichever is in the lock position) engage the latch-engaging member 66 of the frame 12, thus causing the utility bed 20 to be incapable of pivoting from the hauling position (FIG. 1) to the dumping position (FIG. 3). A locking device can accordingly prevent dumping of a utility bed when either or both rear seats of the utility bed are deployed. This functionality can be completely independent of the primary dump control mechanism, control, and/or linkage provided on the vehicle, that facilitates an operator's initiation of the dumping of the utility bed.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
   a frame;
   a utility bed comprising a bed frame, the utility bed being pivotally coupled with the frame and pivotable between a hauling position and a dumping position;
   a seat, the seat comprising a seat back, the seat back being pivotally coupled with the bed frame and pivotable between a stowed position and a deployed position;
   a locking device coupled with the bed frame and comprising a latch, the latch being moveable relative to both the bed frame and the seat back, between a lock position and an unlock position; wherein
   when the seat back is in the stowed position, the latch is in the unlock position and disengaged from the frame; and
   when the seat back is in the deployed position and the utility bed is in the hauling position, the latch is in the lock position and engaged with the frame.

2. The vehicle of claim 1, wherein:
   the seat back comprises a seat back frame and a seat back cushion supported by the seat back frame, the seat back frame being pivotally coupled with the bed frame;
   when the seat back is in the deployed position, the seat back frame is spaced from the latch;
   when the seat back is in the stowed position, the seat back frame contacts the latch; and
   the utility bed is incapable of pivoting from the hauling position to the dumping position while the latch is engaged with the frame.

3. The vehicle of claim 2, wherein:
   the frame comprises a latch-engaging member;
   the locking device further comprises a latch bracket, the latch comprising an actuator portion and an engagement portion, the latch bracket being attached to the bed frame of the utility bed, and the latch being pivotally coupled to the latch bracket; and
   when the seat back is in the stowed position, the seat back frame contacts the actuator of the latch such that the latch is disengaged from the latch-engaging member.

4. The vehicle of claim 3, wherein:
   when the seat back is in the deployed position and the utility bed is in the hauling position, the engagement portion of the latch is engaged with the latch-engaging member.

5. The vehicle of claim 4, wherein:
   the locking device further comprises a pivot member coupled with the latch bracket, the pivot member defining a pivot axis;
   the latch is pivotable about the pivot axis;
   the seat back is pivotally coupled with the bed frame about a seat axis; and
   the pivot axis is generally transverse to the seat axis.

6. The vehicle of claim 5, wherein:
   the bed frame defines a channel and a slot communicating with the channel;
   the actuator portion of the latch comprises a proximal end portion received through the slot and into the channel; and
   when the seat back is in the stowed position, the seat back frame forces the proximal end portion of the latch downwardly within the channel.

7. The vehicle of claim 5, wherein:
   the locking device further comprises a biasing member configured to bias the latch toward the lock position.

8. The vehicle of claim 7, wherein:
   the biasing member comprises a spring disposed in surrounding relationship with the pivot member and coupled with the latch.

9. The vehicle of claim 3, wherein:
   the engagement portion of the latch comprises a distal end portion that is generally hook-shaped.

10. The vehicle of claim 9, wherein:
    the actuator portion of the latch comprises a handle and a cap;
    the cap covers at least a portion of the handle;
    the cap is configured to selectively contact the seat back frame; and
    the handle and the engagement portion are formed as a unitary structure from sheet metal.

* * * * *